V. E. RANDALL.
REVERSING GEAR.
APPLICATION FILED JUNE 19, 1908.
961,316.
Patented June 14, 1910.
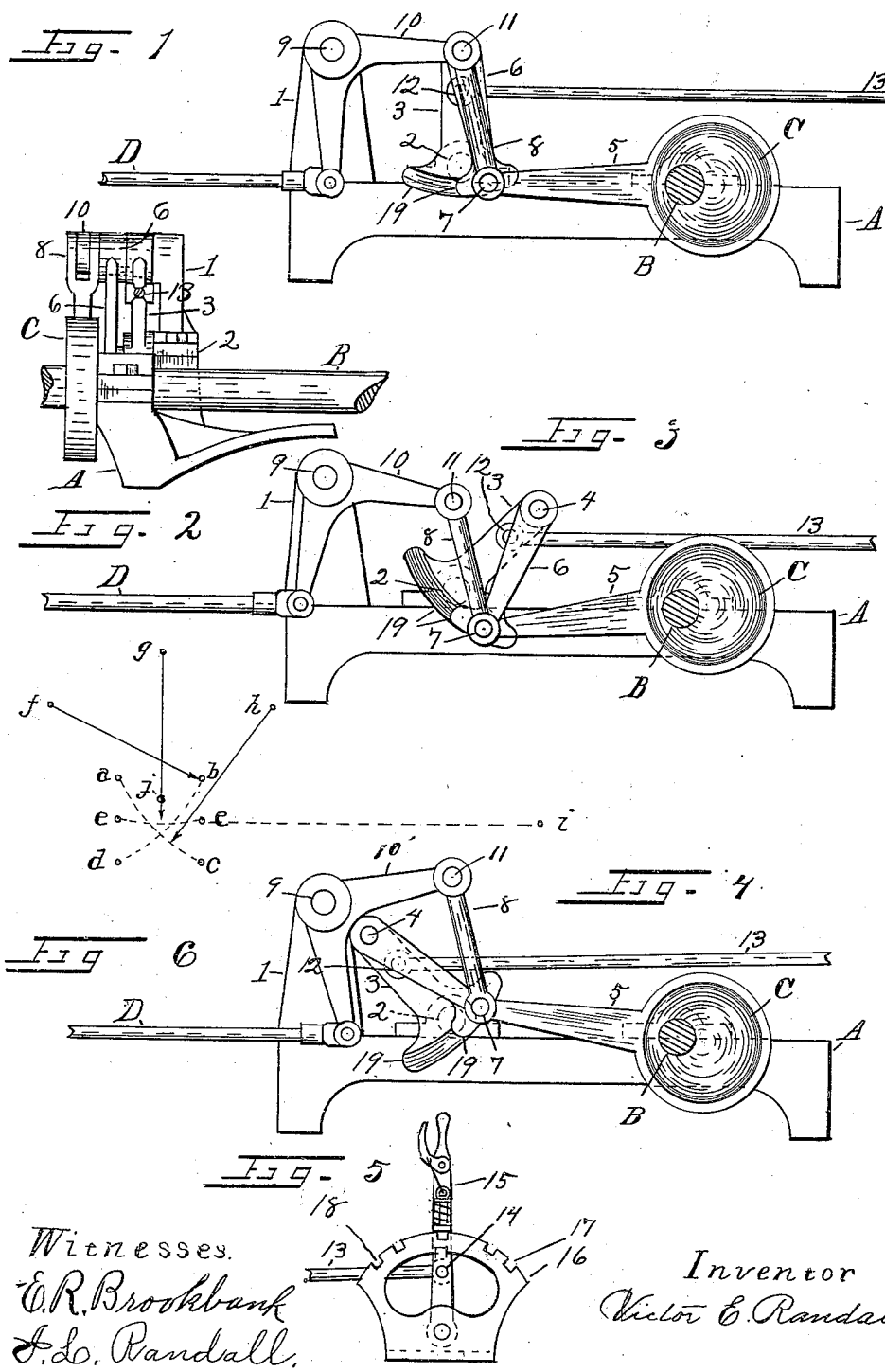
Witnesses
E. R. Brookbank
J. L. Randall
Inventor
Victor E. Randall

UNITED STATES PATENT OFFICE.

VICTOR E. RANDALL, OF BATTLE CREEK, MICHIGAN.

REVERSING-GEAR.

961,316.  Specification of Letters Patent.  Patented June 14, 1910.

Application filed June 19, 1908. Serial No. 439,269.

*To all whom it may concern:*

Be it known that I, VICTOR E. RANDALL, a citizen of the United States, residing at Battle Creek, in the county of Calhoun and State of Michigan, have invented certain new and useful Improvements in Reversing-Gears for Steam-Engines, of which the following is a specification.

This invention relates to reversing gears for steam and other engines where a piston is controlled by a valve adapted to open and close the cylinder ports.

The object of the present invention is to employ a mechanism with a single eccentric whereby the valve motion can be varied, the engine reversed or the valve brought to a standstill over the ports regardless of the motion of the eccentric.

Among other objects I provide a reversing gear that will be simple in construction, positive in its operation, economical to manufacture, symmetrical in design and easy to control when in operation.

In single eccentric reversing gears for engines as ordinarily constructed, no provision has been made to prevent the valve from having some movement midway of its throw, when the quadrant lever is moved to center position. When equipped with such gear the engine will have some movement, owing to the connection between the eccentric stem and valve lever having a slight reciprocating motion, which it imparts to the valve. A feature of my reversing gear is overcoming this objection and causing the valve to rest or remain idle when thrown midway of its stroke by the reversing lever, and cover both cylinder ports.

My invention is illustrated in the accompanying drawings, in which,

Figure 1 is a side elevation showing the position of the parts when the eccentric is at its extreme throw and the reverse lever in mid-position; Fig. 2 is an end elevation of Fig. 1, looking toward the left; Fig. 3 represents the apparatus of Fig. 1, when the reverse lever is at one extreme position; Fig. 4 represents the same when the reverse lever is at the other extreme position; Fig. 5 represents the quadrant with the reverse lever at mid-position; and Fig. 6 is a diagram of the movement.

In the said drawings, A represents an engine bed provided with a shaft B having an eccentric C. On the bed A are brackets 1 and 2 supporting pivoting pins on which are mounted the operating parts of the valve gear. On the pivoting pin in the bracket or bearing 2 is a rock-arm 3 having a second pivoting pin 4 at its upper end. A connecting rod 13 extends between a pin 12 on the rock-arm 3 and another pin 14 on the reverse lever 15, these parts serving to adjust the position of the rock-arm 3 on its pivotal support in the bracket 2.

Supported on a pivot 9 in the bracket 1 is a bell-crank 10, one arm of which is connected to a valve stem D, and the other arm of which is provided with a pivoting pin 11.

Mounted to swing freely on the pivot 4 is an arm 6, and mounted to swing freely on the pivot 11 is another arm or pitman 8. The arms 6 and 8 are of the same length and have their free ends connected together and to the end of the eccentric stem 5 by means of a pin 7. As thus constructed, the movements of the eccentric cause the arms 6 and 8 to swing upon their respective pivots, the lower ends of said arms being constrained to move in an arc determined by the position of the pivoting pin 4.

The pin 4 is adjustable in an arc about the support of rock-arm 3 by means of the connecting rod 13 and the lever 15 as before described. This arc crosses the arc through which the pin 11 moves when the bell-crank 10 vibrates on its pivot 9. When the pin 4 is adjusted to and held at a point on the arc of the pin 11, the axes of 4 and 11 will coincide, and a movement of the eccentric C will cause arms 6 and 8 to swing as one arm without causing a movement of the bell-crank 10. This position is shown in Fig. 1. When, however, the pin 4 is moved to, and held at, some position which does not coincide with the arc of the pin 11, the constrained movement of the pin 7 about the pin 4 as a center causes the bell-crank 10 to vibrate on its pivot 9. The lever 15 and quadrant 16 with its notches 17, 18, etc., provide the means for adjusting the pin to and holding it at desired positions.

The axis of the support of the rock arm 3 is located vertically beneath the pin 11 so that when the pin 4 is adjusted to cause its axis to coincide with the axis of pin 11, the rock arm 3 will be vertical and in its mid-position. From this position the pin 4 may be adjusted to either side of the arc through which the pin 11 moves when the bell-crank 10 is vibrated. When the pin 4 is on one side of this arc, a given movement of the eccentric C will result in moving the bell-crank 10 in one direction, while if the pin 4 is on the other side of the arc the same movement of the eccentric will result in moving the bell-crank in the opposite direction.

In Fig. 6, the point $j$ represents the pivoting point for the rock arm 3, and the points $f$, $g$ and $h$ represent three positions of the pin 4 adjusted about the center $j$. The straight lines extending from the points $f$, $g$ and $h$ represent the link or arm 6 vibrating about these points to cause the pin 7 to traverse arcs $b$—$d$, $e$—$e$ and $a$—$c$ when moved by an eccentric rotating about an axis $i$. The resultant movement of the bell-crank 10, and consequently of a valve moved by the connected stem D, is represented by the vertical distance between the points at the extremities of these arcs.

The arcs through which the pin 7 moves vary according to the position of the pivot 4. When this pivot is adjustable about a center, as $j$ of Fig. 6, these arcs, and the consequent valve movements, are most uniform when the center $j$ is located one-fourth of the length of the arc $e$—$e$ above the extended center line from $i$ to $e$.

To avoid unnecessary and undesirable strains on pins 4, 7 and 11, a portion of the rock-arm 3 is extended downward and provided with a rubbing or bearing surface 19 opposite the arc through which the pin 7 moves, and the lower end of the arm 6 is provided with a broadened surface which slides on said surface 19.

What I claim is:

1. In a valve gear, the combination with two pivotally supported arms of equal length having their free ends connected together, and means for vibrating said arms on their pivots, of connections from the pivot of one arm to a valve stem, and means for adjusting the position of the pivot of the other arm with respect to the pivot of the first mentioned arm.

2. The combination with an eccentric rod, and a valve stem, of a plurality of pivoted members connecting the two and serving to communicate motion from the rod to the stem, said members being adjustable to a position in which movements of the rod are not communicated to the stem, and means for adjusting said pivoted members.

3. In a reversing gear, the combination with an eccentric rod and a valve operating lever, of a rock arm, means for adjusting the position of said rock arm, an oscillatory arm pivoted to the rock arm and having its free end connected to the eccentric rod, and a link having one end pivoted to the free end of the oscillatory arm and having its other end connected to the valve operating lever.

4. In a reversing gear, the combination with an eccentric stem and a valve-operating lever fulcrumed between its extremities, of an adjustable support, an oscillatory arm connected to said support and also connected to the eccentric stem, a pitman pivoted to the eccentric stem in union with said oscillatory arm and hinged to the valve lever opposite the fulcrum from the valve connection therewith, and means to actuate said support whereby the valve may be drawn to or beyond an idle position to reverse an engine.

5. In a reversing gear, the combination with an eccentric stem and valve rod, of a rock arm, an oscillatory arm supported on the rock arm beyond the pivotal support and pivotally connected to the eccentric stem, a valve-operating lever fulcrumed between its extremities, a pitman pivoted to said eccentric stem in union with said oscillatory arm and hinged to the valve lever opposite the fulcrum from the valve connection therewith, and means to actuate said rock arm whereby the valve may be drawn either to or beyond an idle position to reverse an engine.

6. In a reverse gear, the combination with a valve rod and an eccentric stem, of a rock arm, an arm pivotally suspended from said rock arm and pivotally connected to the eccentric stem, a bell crank connected to the valve rod, a pitman suspended from said crank and pivotally connected to the eccentric stem in union with said lever, and means to actuate said rock arm whereby the valve may be drawn to or beyond an idle position to reverse an engine, all arranged to coact, substantially as described.

7. In a reversing gear, the combination with an eccentric stem and valve rod, of a rock arm disposed between the adjacent extremities of said eccentric stem and valve rod, an oscillatory arm hinged at one end to the outer extremity of said rock arm and pivotally connected at the opposite end to the eccentric stem, a bell crank pivotally connected at one extremity to the valve rod, its opposite extremity being adapted to describe an arc which cuts the arc of the rock arm above its axis, a pitman hinged to said extremity and having a pivotal union with said oscillatory lever to said eccentric stem, and means to actuate said rock arm whereby the valve may be drawn either to or beyond an idle position to reverse an engine.

8. In a reversing gear, the combination with an eccentric stem and valve rod adapted to operate in the same general alinement, of a rock arm disposed between the adjacent extremities of said valve rod and eccentric stem and pivotally sustained at the end of the eccentric stem midway of its throw and one-fourth ($\frac{1}{4}$) of the throw of the eccentric to one side of the eccentric stem, a bell crank pivotally connected at one extremity to said valve rod, its opposite extremity being adapted to describe an arc which cuts the arc of the rock arm above its axis, a pitman having a pivotal connection with said eccentric stem, an oscillatory arm hinged at one end to the outer extremity of said rock arm and pivotally connected at its opposite end to said eccentric stem at the same point as said pitman, and means to actuate said rock arm whereby the valve may be drawn to or beyond an idle position to reverse an engine.

9. In a reversing gear, the combination with an eccentric stem and a valve rod, of a rock arm pivotally sustained near the end of the eccentric stem midway of its throw and one-fourth ($\frac{1}{4}$) of the throw of the eccentric to one side of the stem, a bell crank pivotally connected at one extremity to said valve rod, its opposite end being adapted to describe an arc which cuts the arc of the rock arm above its axis, an oscillatory arm pivotally supported from the outer end of said rock arm, a pitman pivotally supported from said bell crank opposite the valve connection, said pitman and oscillatory arm being of the same length and pivoted together at their ends remote from the axis of said arm and pivoted to said eccentric stem at the same point, and a lever hinged to said rock arm whereby said arm can be swung to vary the throw of the valve to or beyond an idle position with respect to the eccentric to reverse an engine, substantially as set forth.

10. In a reversing gear, the combination of an oscillating lever pivoted at one end to an adjustable support mounted on an axis adjacent to the free end of said lever, means connected to said adjustable support for moving its pivotal connection with said lever through equal arcs on the two sides of its range of adjustment, means connected to the free end of said rock arm for transmitting motion therefrom to the valve, the means for transmitting motion to the valve imparting no motion thereto when the adjustable support is in the middle position of its range of adjustment.

VICTOR E. RANDALL.

Witnesses:
R. F. WINGATE,
F. H. WINGATE.